(12) United States Patent
Viberg et al.

(10) Patent No.: US 11,795,725 B2
(45) Date of Patent: Oct. 24, 2023

(54) TELESCOPIC EDGE PROTECTION POST

(71) Applicant: WORXSAFE AB, Östersund (SE)

(72) Inventors: Olov Viberg, Östersund (SE); Bengt Jönsson, Ås (SE)

(73) Assignee: WORXSAFE AB, Östersund (SE)

( * ) Notice: Subject to any disclaimer, the term of this patent is extended or adjusted under 35 U.S.C. 154(b) by 69 days.

(21) Appl. No.: 17/687,256

(22) Filed: Mar. 4, 2022

(65) Prior Publication Data
US 2022/0282514 A1  Sep. 8, 2022

(30) Foreign Application Priority Data

Mar. 4, 2021 (EP) .................................... 21160826

(51) Int. Cl.
| | |
|---|---|
| *E04H 12/18* | (2006.01) |
| *E04G 25/08* | (2006.01) |
| *F16B 7/14* | (2006.01) |
| *E04G 25/06* | (2006.01) |
| *E04G 25/04* | (2006.01) |
| *E04G 21/32* | (2006.01) |

(Continued)

(52) U.S. Cl.
CPC ....... *E04H 12/182* (2013.01); *E04G 21/3233* (2013.01); *E04G 25/04* (2013.01); *E04G 25/065* (2013.01); *E04G 25/066* (2013.01); *E04G 25/08* (2013.01); *E04H 17/21* (2021.01); *F16B 7/14* (2013.01); *E04G 2025/006* (2013.01)

(58) Field of Classification Search
CPC ..... E04H 12/182; E04H 17/21; E04H 17/009; E04H 17/22; E04G 25/066; E04G 25/08; E04G 2025/006; E04G 2025/042; E04G 21/3233; E04G 21/3204; E04G 25/04; E04G 25/065; E04G 2025/045; F16B 7/14

USPC .......... 248/188.5, 125.8, 354.1, 412, 231.31; 52/127.2
See application file for complete search history.

(56) References Cited

U.S. PATENT DOCUMENTS

| | | | | |
|---|---|---|---|---|
| 1,651,610 A | * | 12/1927 | Markham | ............... E04G 25/08 |
| | | | | 254/133 R |
| 1,847,660 A | * | 3/1932 | Markham | ............... E21D 15/43 |
| | | | | 248/354.1 |

(Continued)

FOREIGN PATENT DOCUMENTS

| | | |
|---|---|---|
| EP | 3620595 A1 | 3/2020 |
| GB | 2256022 A | 11/1992 |

(Continued)

*Primary Examiner* — Brent W Herring
(74) *Attorney, Agent, or Firm* — Volpe Koenig

(57) ABSTRACT

A telescopic edge protection post arrangeable between a floor and a ceiling, wherein the telescopic edge protection post comprises an outer tube having a floor end and a top end, and an inner tube having a bottom end and a ceiling end. The inner tube extends into the outer tube and is movable with respect thereto between an extended position and a collapsed position. The post further has a locking mechanism arranged to lock the inner tube with respect to the outer tube, and a tensioning device. The locking mechanism comprises a fixed element, which is attached to the outer tube at its top end, and a movable element, which is movable with respect to the fixed element between a locking position in which the movable element engages with the inner tube and the fixed element to prevent the inner tube from being retracted into the outer tube.

15 Claims, 13 Drawing Sheets

(51) Int. Cl.
*E04H 17/20* (2006.01)
*E04G 25/00* (2006.01)

(56) References Cited

U.S. PATENT DOCUMENTS

| | | | | |
|---|---|---|---|---|
| 2,031,754 | A * | 2/1936 | Bacigalupi | B05B 15/656 |
| | | | | 285/302 |
| 2,703,691 | A * | 3/1955 | Minnis | F16M 13/00 |
| | | | | 396/428 |
| 2,937,842 | A * | 5/1960 | Meek | E04F 21/1805 |
| | | | | 182/129 |
| 3,072,425 | A * | 1/1963 | Nicholls | A47B 91/024 |
| | | | | 403/109.5 |
| 3,210,047 | A * | 10/1965 | Jackson | E04G 25/08 |
| | | | | 248/354.3 |
| 3,292,892 | A | 12/1966 | Abbott | |
| 4,080,080 | A * | 3/1978 | Cisler | F16B 7/1472 |
| | | | | 248/188.5 |
| 5,769,580 | A * | 6/1998 | Purvis | B60P 7/15 |
| | | | | 410/151 |
| 6,851,652 | B1 * | 2/2005 | Huang | E04G 25/08 |
| | | | | 248/200.1 |
| 8,152,118 | B2 | 4/2012 | Melic | |
| 2009/0152431 | A1 * | 6/2009 | Melic | E04G 21/3233 |
| | | | | 248/354.1 |
| 2010/0037537 | A1 * | 2/2010 | Lee | E04G 25/06 |
| | | | | 52/126.6 |
| 2010/0243849 | A1 * | 9/2010 | Wang | E04G 25/065 |
| | | | | 248/354.4 |
| 2012/0034023 | A1 * | 2/2012 | Wang | B60P 7/15 |
| | | | | 403/109.3 |
| 2014/0133899 | A1 * | 5/2014 | Huang | E04G 25/06 |
| | | | | 403/109.2 |
| 2015/0159804 | A1 * | 6/2015 | Bowman | F16M 11/045 |
| | | | | 248/122.1 |
| 2020/0407990 | A1 * | 12/2020 | Moss | E04G 25/08 |
| 2021/0340783 | A1 * | 11/2021 | Holmbom | E04G 25/08 |

FOREIGN PATENT DOCUMENTS

| | | |
|---|---|---|
| KR | 10-2016-0126791 A | 11/2016 |
| WO | 2007/016785 A2 | 2/2007 |

* cited by examiner

TELESCOPIC EDGE PROTECTION POST

FIELD OF INVENTION

The present invention relates to a support post for an edge protection system. More particularly, it relates to a telescopic edge protection post comprising a tensioning device for mounting the edge protection post between two surfaces, typically a floor and a ceiling.

TECHNICAL BACKGROUND

Telescopic support posts can be used for edge protection systems in which they are temporarily arranged between support surfaces mounted at a construction or maintenance site to provide stable and safe working platforms. Mounted edge protection posts can furthermore provide attachment points for safety panels extending between two posts.

U.S. Pat. No. 8,152,118 discloses a telescopic support post for a safety fence assembly comprising a tensioning and locking device comprising a collar element positioned at a top end of the outer tube and surrounding the inner tube. The tensioning and locking device further comprises a pivoting lever, which is arranged to move the collar element to a tilted configuration in which the collar element is tilted relative to the inner tube for engagement of the collar element with the inner tube. When tilted, the collar element is able to bring the inner tube along during the final pivoting movement of the lever, thereby urging the ceiling engaging end of the support post against the ceiling. The tensioning and locking device further comprises an upper tensioning device, which comprises a spring being compressed by the movement of the pivoting lever. When the pivoting movement has been completed the lever is in a locking position.

There are some drawbacks with this known support post. For example, the mounting of the support post between the floor and the ceiling is troublesome since the user has to hold the inner tube in the extended position while simultaneously operating the lever to tension the post.

SUMMARY

It would be advantageous to facilitate the mounting of an edge protection post. To better address this concern, in a first aspect there is presented a telescopic edge protection post arrangeable between a floor and a ceiling, the telescopic edge protection post comprising an outer tube having a floor end and a top end, and having a polygonal cross-section, an inner tube having a bottom end and a ceiling end, and having a polygonal cross-section, wherein the inner tube extends into the outer tube and is movable with respect thereto between an extended position and a collapsed position, a locking mechanism arranged to lock the inner tube with respect to the outer tube, and a tensioning device, wherein the locking mechanism comprises a fixed element, which is attached to the outer tube at its top end, and a movable element, which is movable with respect to the fixed element between a locking position in which the movable element engages with the inner tube and the fixed element to prevent the inner tube from being retracted into the outer tube, and a non-locking position in which the inner tube is retractable into the outer tube, wherein the movable element is arranged at a corner of the inner tube and is engaged with, at least in the locking position, first two adjacent sides of the inner tube at said corner, thereby fixing, in the locking position, the inner tube relative to the outer tube in all transverse directions of the telescopic edge protection post.

Due to the construction of the locking mechanism it is possible to extend the post with a simple maneuvering of the movable element. For example, the locking mechanism may be arranged to enable the movable element to enter the locking position by means of the gravity force, i.e. by means of its own weight. Additionally, by means of the corner arrangement of the movable element the locking of the inner tube relative to the outer tube is more controlled than the if a locking mechanism engaging with a single side or two opposite sides of the inner tube is used. For example, in order to be able to easily telescope the telescopic edge protection post, typically, there is a play between the inner and outer tubes. When the telescopic edge protection post is mounted the user may experience an instability due to this play, and it may cause some rattling noise if the post vibrates due to wind or other causes. The movable element fixes the inner tube relative to the outer tube in all transverse directions of the telescopic edge protection post in the locking position, thereby eliminating or substantially reducing those inconveniences.

In accordance with an embodiment of the telescopic edge protection post, the engagement between the movable element and the inner tube, in the locking position, is frictional. The locking mechanism is thereby self-locking.

In accordance with an embodiment of the telescopic edge protection post, the fixed element comprises an inner surface surrounding the inner tube and being provided with protruding surface portions at a corner of the inner tube opposite of the corner where the movable element is arranged. The protruding surface portions extend at an angle to each other and parallel with second two adjacent sides of the inner tube, wherein the protruding surface portions are engaged with the inner tube in the locking position. Thereby, in the locking position, the inner tube is held in a substantially centered position relative to the outer tube.

In accordance with an embodiment of the telescopic edge protection post, the movable element is arranged to move upwards and outwards from the locking position to the non-locking position.

In accordance with an embodiment of the telescopic edge protection post, the movable element has an inner engagement surface facing an outer surface of the inner tube, wherein the inner engagement surface is arranged to engage with the outer surface of the inner tube.

In accordance with an embodiment of the telescopic edge protection post, the inner engagement surface is provided with grip protrusions, which provide the engagement with the outer surface of the inner tube. Thereby, the engagement between the movable element and the inner tube is enhanced.

In accordance with an embodiment of the telescopic edge protection post, the movable element is wedge-shaped, thereby additionally facilitating the locking and unlocking.

In accordance with an embodiment of the telescopic edge protection post, the movable element comprises one of a rotatable roller and an eccentrically rotatable member.

In accordance with an embodiment of the telescopic edge protection post there is a gap between the inner tube and the outer tube, thereby facilitating extension and retraction of the post.

In accordance with an embodiment of the telescopic edge protection post, the inner tube is provided with guide protrusions protruding outwardly from an outer surface of the inner tube at the bottom end thereof. Thereby a sense of instability that may be perceived by some user due to the gap is eliminated or decreased.

In accordance with an embodiment of the telescopic edge protection post, the tensioning device comprises a lower tensioning device arranged at the floor end of the outer tube. This is advantageous in that there is less weight at the ceiling end of the post relative to the prior art posts having the tensioning device at that ceiling end.

In accordance with an embodiment of the telescopic edge protection post, it comprises a floor gripper positioned at the floor end of the outer tube and constituting a foot of the telescopic edge protection post. The lower tensioning device comprises a threaded rod having a lower end attached to the floor gripper and extending into the outer tube, the threaded rod being rotatably and longitudinally movably mounted at the outer tube, a nut threadedly engaged with the threaded rod and slidingly arranged within the outer tube, and a spring extending within the outer tube between the nut and a spring seat, which is fixed, at least in a spring extension direction, relative to the outer tube. The threaded rod extends through the spring and the spring seat, the spring thereby being tensioned by rotating the outer tube.

In accordance with an embodiment of the telescopic edge protection post, the tensioning device comprises an upper tensioning device arranged at the ceiling end of the inner tube. This tensioning device can be in alternative to the one mentioned above or a complement thereto.

According to another aspect there is provided a telescopic edge protection post arrangeable between a floor and a ceiling, the telescopic edge protection post comprising an outer tube having a floor end and a top end, and having a polygonal cross-section, an inner tube having a bottom end and a ceiling end, and having a polygonal cross-section, wherein the inner tube extends into the outer tube and is movable with respect thereto between an extended position and a collapsed position, a locking mechanism arranged to lock the inner tube with respect to the outer tube, and a tensioning device, arranged at an end of the telescopic edge protection post constituting one of the floor end of the outer tube and the ceiling end of the inner tube, and a gripper at each the end of the telescopic edge protection post. The tensioning device comprises a threaded rod having a first end attached to the gripper and extending into the telescopic edge protection post, the threaded rod being rotatably and longitudinally movably mounted at the tube at which it is arranged, a nut threadedly engaged with the threaded rod and slidingly arranged within said tube, and a spring extending within said tube between the nut and a spring seat, which is fixed, at least in a spring extension direction, relative to said tube, wherein the threaded rod extends through the spring and the spring seat, the spring thereby being tensioned by rotating the telescopic edge protection post. Thereby, the floor end of the outer tube remains at the same or substantially the same height during the tensioning.

BRIEF DESCRIPTION OF THE DRAWINGS

The concepts will now be described in more detail and with reference to the appended drawings in which.

DESCRIPTION OF EMBODIMENTS

Figure 1:
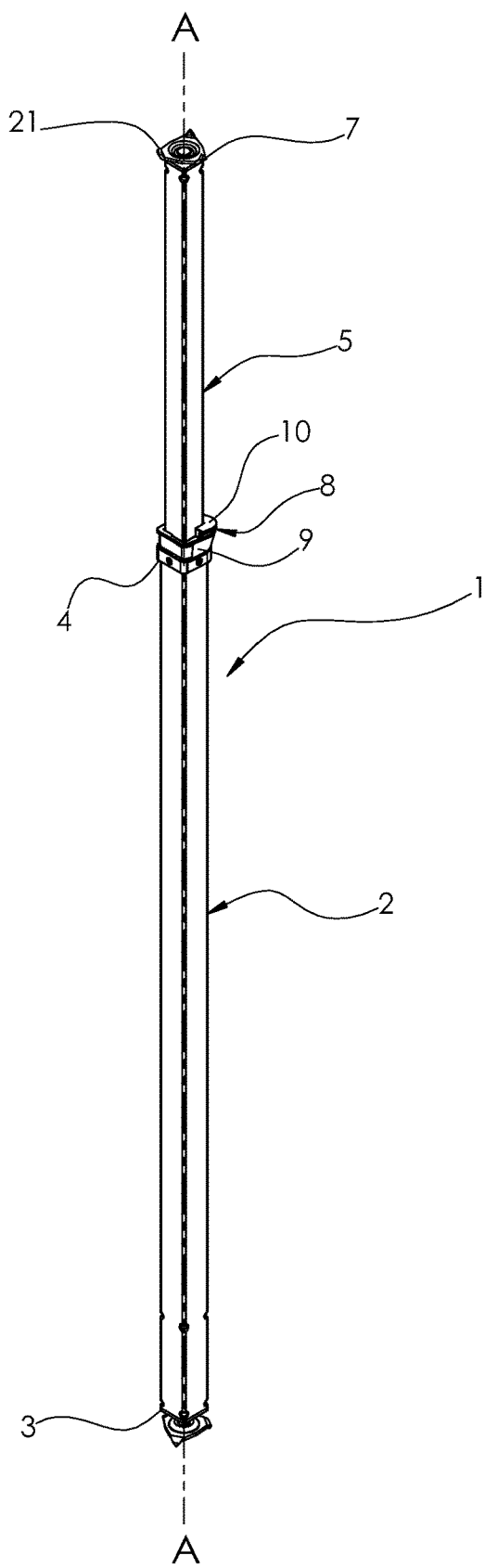
FIG. 1 is a schematic perspective view of an embodiment of the telescopic edge protection post.
Figure 2:
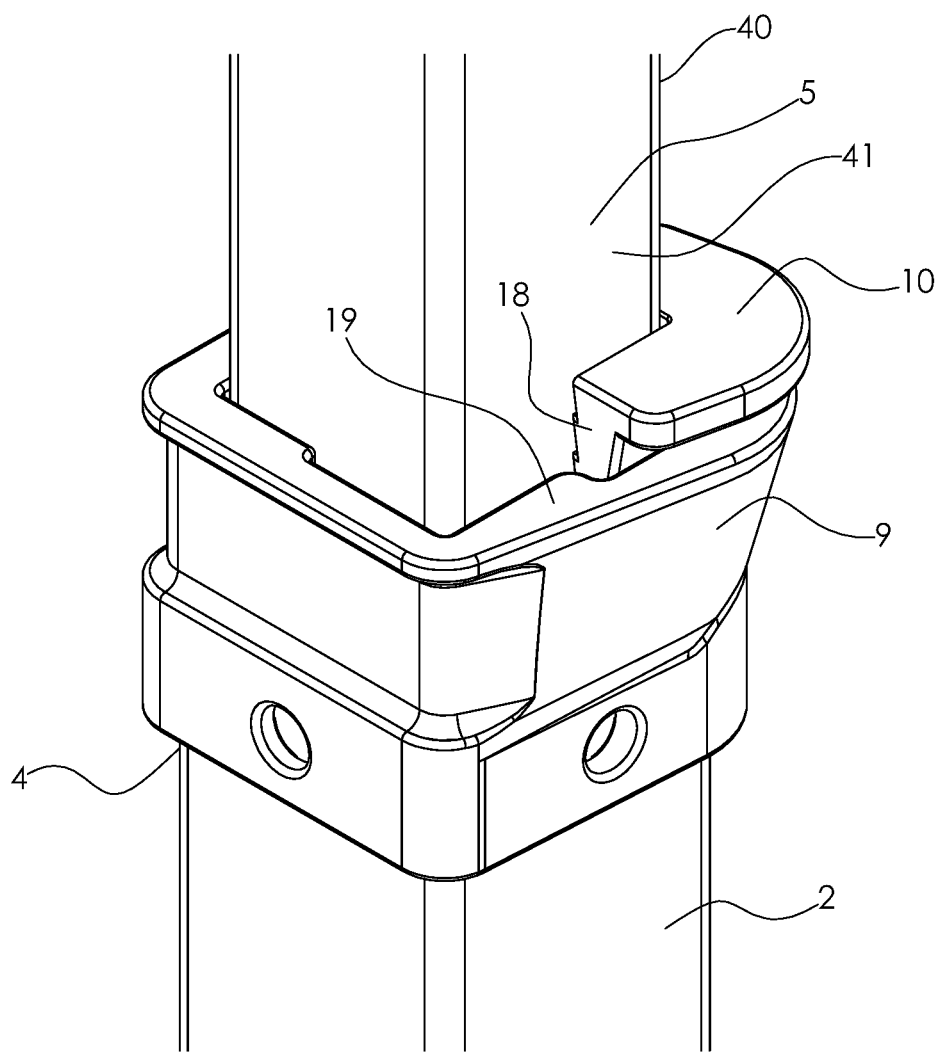
FIGS. 2 and 3 are schematic perspective views of a locking mechanism comprised in embodiments of the telescopic edge protection post.
Figure 3:
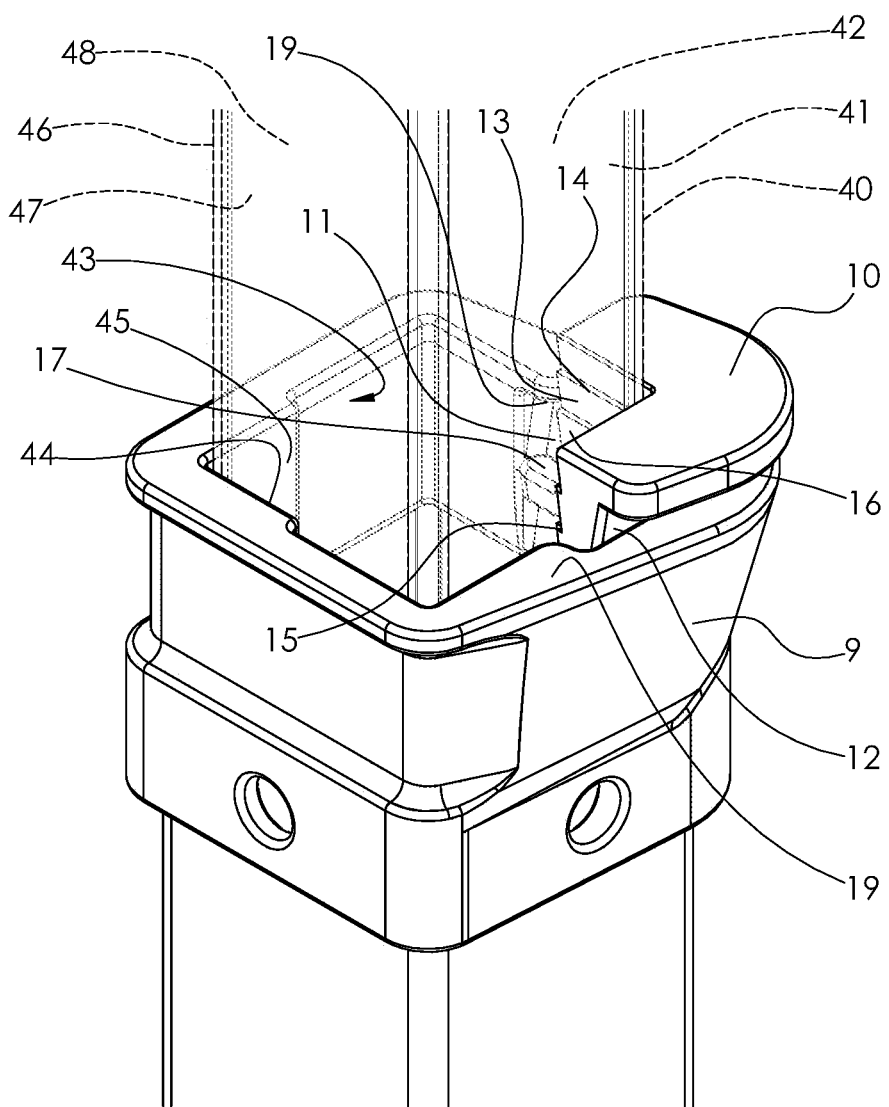
Figure 8:
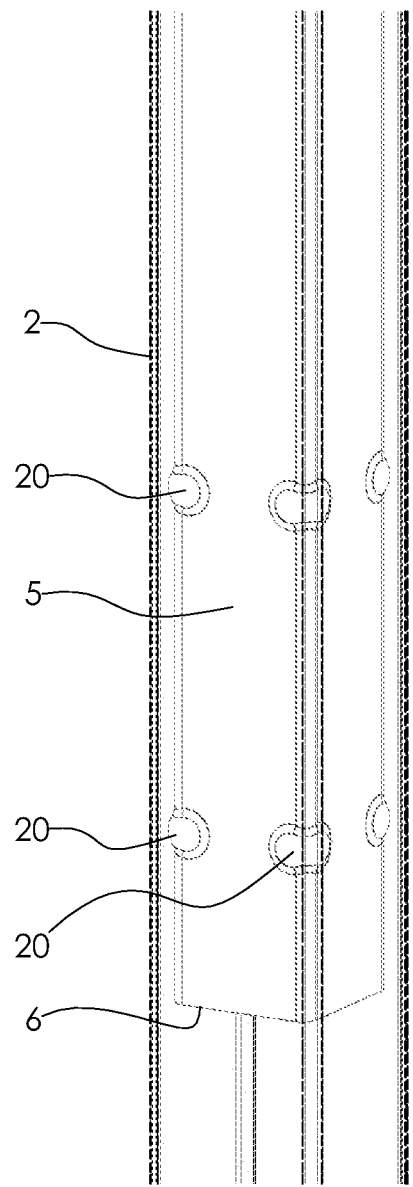
FIG. 8 is a schematic perspective view of a part of the telescopic edge protection post showing details thereof.
Figure 9:
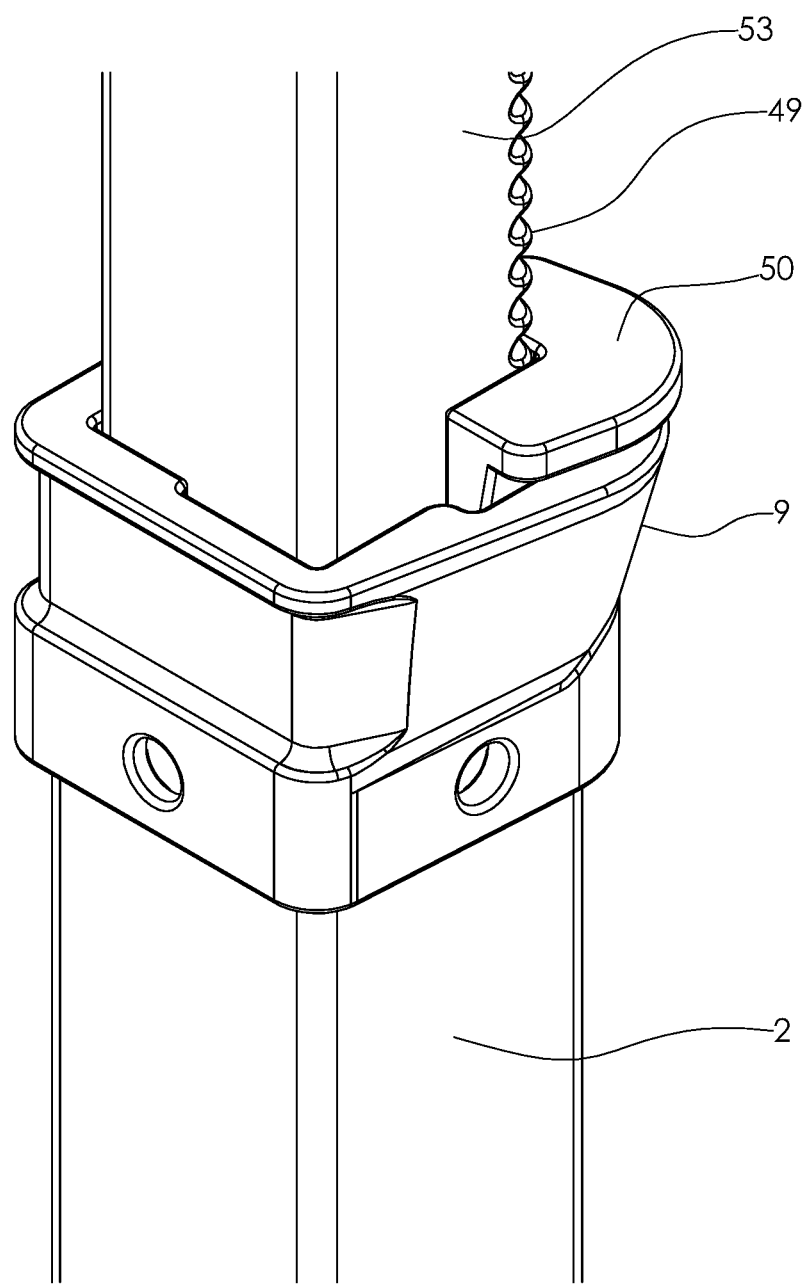
FIGS. 9 to 12 are schematic perspective views of locking mechanisms comprised in embodiments of the telescopic edge protection post.
Figure 10:
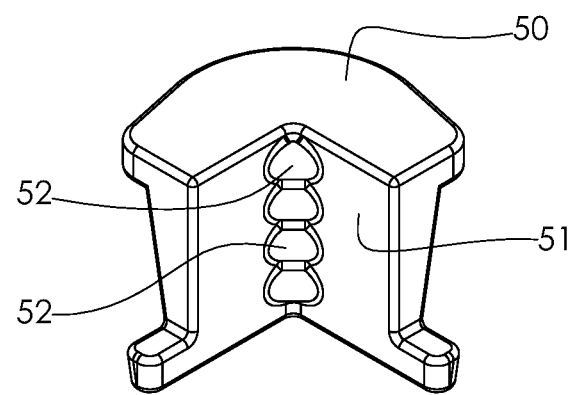
Figure 11:
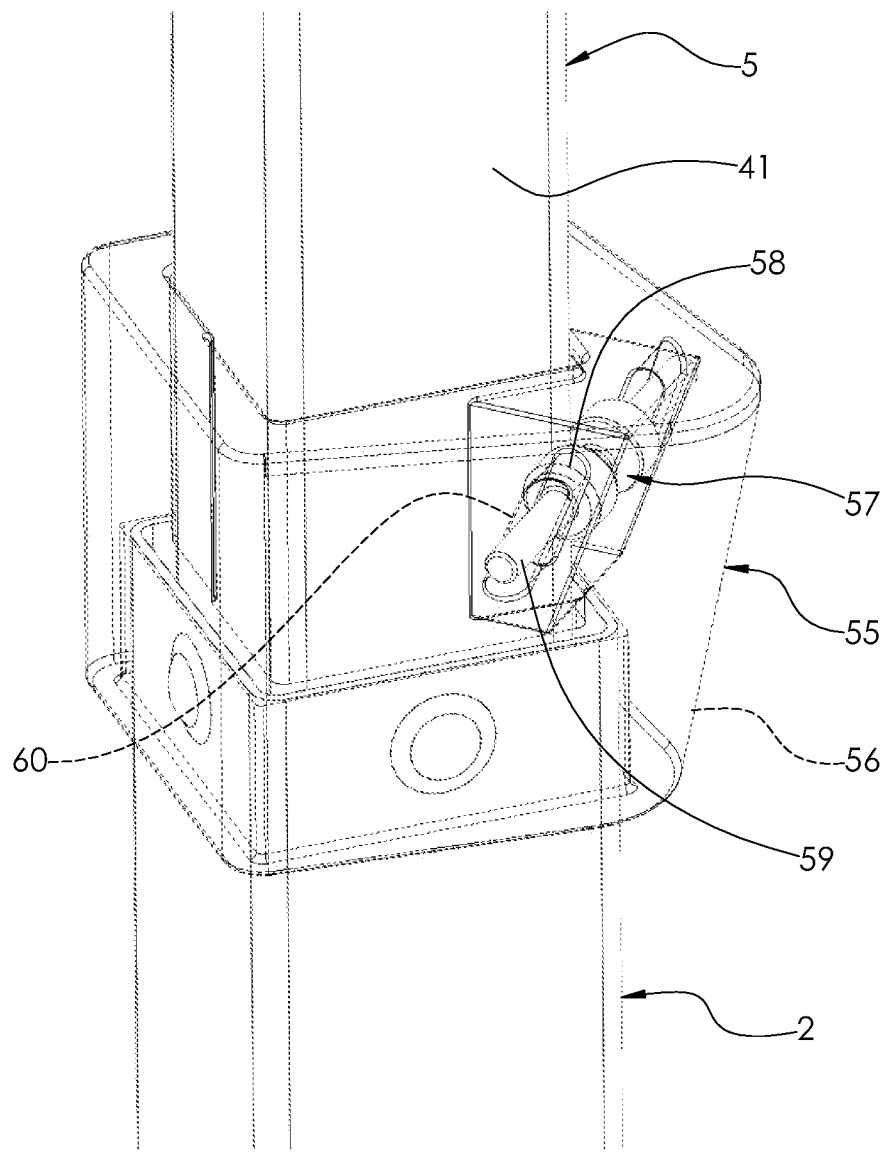

With reference, for example, to FIG. 1, there is provided an embodiment of a telescopic edge protection post 1. The telescopic edge protection post 1 is arrangeable between a floor and a ceiling. Typically, several telescopic edge protection posts 1 are arranged along an edge of a floor above the ground level, and fences are mounted on the telescopic edge protection posts 1 to prevent workers from falling over the edge. The telescopic edge protection post 1 comprises an outer tube 2 having a floor end 3 and a top end 4, an inner tube 5 having a bottom end 6, see FIG. 8, and a ceiling end 7. The inner tube 5 extends into the outer tube 2 and is movable with respect thereto between an extended position and a collapsed position. In other words, the outer and inner tubes 2, 5 are telescoping. In FIG. 1 an extended position of the telescopic edge protection post 1 is shown, though the telescopic edge protection post 1 has not been extended to a maximum length. Preferably, the outer and inner tubes 2, 5 have a rectangular cross-section, such as a square cross-section, but other shapes are feasible as well, such as other polygonal shapes. A longitudinal axis of the telescopic edge protection post 1 extends through its center as shown with the dash-dotted line A-A in FIG. 1. Further, the telescopic edge protection post 1 comprises a ceiling gripper 21 arranged at the ceiling end 7 of the inner tube 5, and a floor gripper 31 arranged at the floor end 3 of the outer tube 2.

Embodiments of the telescopic edge protection post 1 comprise a locking mechanism 8 arranged to lock the inner tube 5 with respect to the outer tube 2. Different optional locking mechanisms are shown in more detail in FIGS. 2 to 5 and 9 to 12. According to one option, the locking mechanism 8 comprises a fixed element 9, which is attached to the outer tube 2 at its top end 4, and a movable element 10, movably engaged with the fixed element 9. The fixed element can be considered to constitute a collar, and it encircles an end portion of the outer tube 2 and protrudes beyond the very top end 4. Thereby, the fixed element 9 can be considered to be tubular. The movable element 10 is movable with respect to the fixed element 9 between a locking position, shown in FIG. 4, in which the movable element 10 engages with the inner tube 5 and the fixed element 9 to prevent the inner tube 5 from being retracted into the outer tube 2, and a non-locking position, shown in FIG. 5, in which the inner tube 5 is retractable into the outer tube 2. More particularly, in this embodiment, the movable element 10 is obliquely movable relative to a longitudinal axis A-A of the telescopic edge protection post 1 between the locking and non-locking positions.

The movable element is arranged at a corner 40 of the inner tube 5 and is engaged with, at least in the locking position, first two adjacent sides 41, 42 of the inner tube 5 at said corner 40. Consequently, the movable element 10 is arranged at a corner of the fixed element 9 as well. The movable element 10 has an inner engagement surface 13 facing an outer surface of the inner tube 5. The inner engagement surface 13 has first and second surface portions 15, 16 extending at an angle, such as perpendicular when the tubes are rectangular, and in parallel with the first two adjacent sides 41, 42, respectively, to engage with them. In other words, the movable element 10 extends around the corner 40 of the inner tube 5. Thereby, when the locking mechanism 8 is locked the inner post 4 is firmly held in a fixed position relative to the outer post 2 in a way that stabilizes their movements relative to each other in transversal directions, in addition to preventing retraction of the telescopic edge protection post.

The fixed element 9 comprises an inner surface 43 surrounding the inner tube 5 and being provided with protruding surface portions, or heel portions, 44, 45 at a corner 46 of the inner tube 5 opposite of the corner 40, i.e. diagonally of the corner 40, where the movable element 10 is arranged. The protruding surface portions 44, 45 extend at an angle to each other and parallel with second two adjacent sides 47, 48 of the inner tube 5, wherein the protruding surface portions 44, 45 are engaged with the inner tube 5 in the locking position.

The fixed element 9 is provided with a slide surface 11, which is inclined with respect to the longitudinal axis such that it is sloping towards the longitudinal axis in direction towards the floor end 3 of the outer tube 2. The movable element 10 is provided with a corresponding slide surface 12 engaged with the slide surface 11 of the fixed element 9. The engagement between the movable element 10 and the inner tube 5 is frictional.

In the locking position, the movable element 10 is clamped between the fixed element 9, and more particularly the slide surface 11 of the fixed element 9, and the inner tube 5, and more particularly the outer surface of the inner tube 5. The movable element 10, in turn, exerts a force on the inner tube 5 to clamp it against the fixed element 9 opposite of the movable element 10, i.e. against the protruding surface portions 44, 45 of the fixed element 9.

Figure 4:
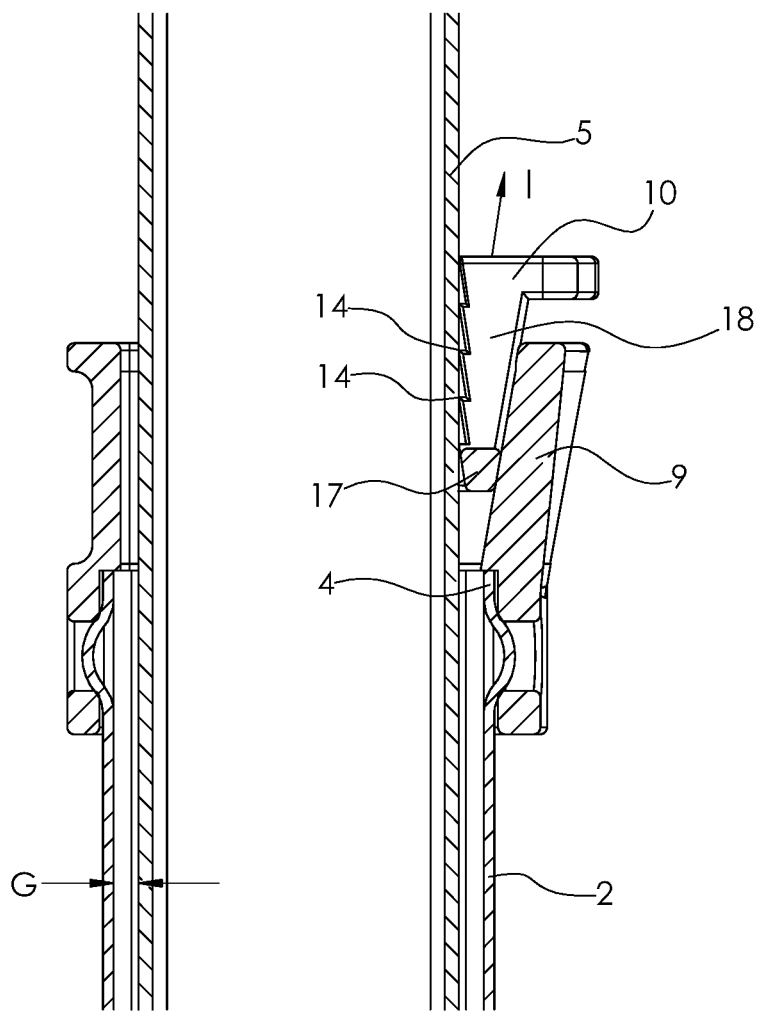
FIGS. 4 and 5 are sectional views illustrating operation of the locking mechanism.
Figure 5:
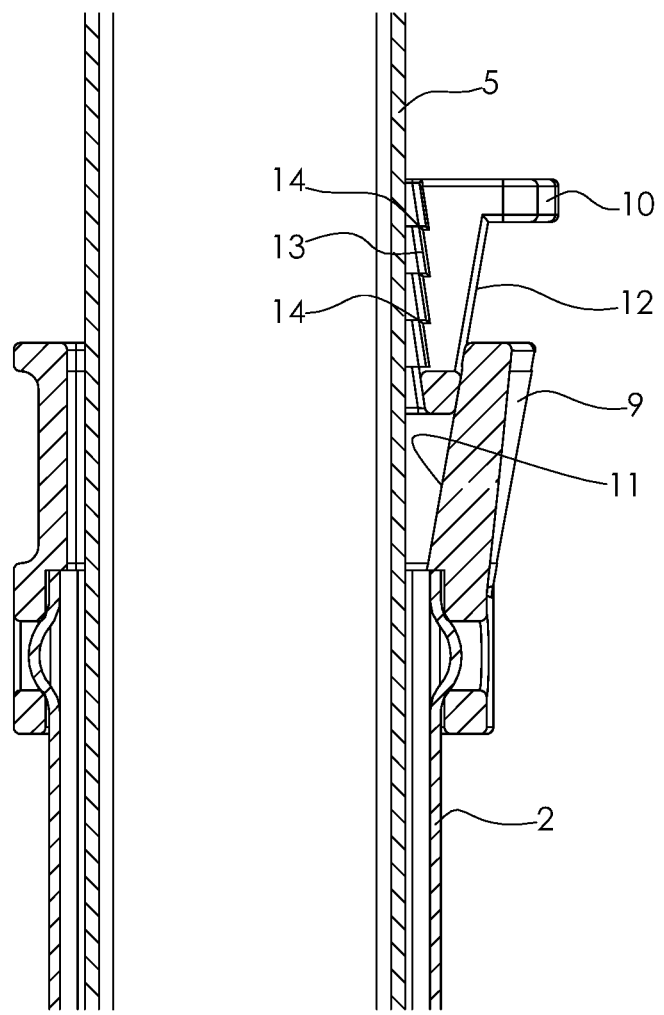

In embodiments of the telescopic edge protection post 1 the movable element 10 is arranged to move upwards and outwards from the locking position to the non-locking position, i.e. as shown with an arrow 1 in FIG. 4. In other words, the movable element 10 moves away from the top end 4 of the outer tube 2, and away from the longitudinal axis A-A, thereby generating a gap between the inner engagement surface 13 of the movable element 10 and the outer surface of the inner tube 5.

In embodiments of the telescopic edge protection post 1 the inner engagement surface 13 is provided with friction enhancing portions, more particularly grip protrusions such as grip edges 14, which provide the engagement with the outer surface of the inner tube 5. In an alternative embodiment, shown in FIGS. 9 and 10, the outer surface of the inner tube 5 is provided with friction enhancing portions, such as knurled surfaces, for instance knurling 49 at the corner of the inner tube 53, instead of or in addition to the inner engagement surface 13. For instance, the engagement surface 51 of the movable element 50 can be provided with knobs 52 at an inner corner thereof facing the knurled corner of the inner tube 53 and engaging with the knurling 49 in the locking position.

In embodiments of the telescopic edge protection post 1 the movable element 10 is wedge-shaped, i.e. the slide surface 12 and the inner engagement surface 13 are non-parallel. Thus, the movable element is tapered, and the narrower end of the movable element 10 is closer to the floor end 3 of the outer post 2 than the wider end.

In embodiments of the telescopic edge protection post 1 the movable element 10 is provided with at least one retainment portion 17 protruding laterally from at least one end wall 18 of the movable element 9. The fixed element is correspondingly provided with at least one stop shoulder 19 at a top mouth thereof extending laterally of the telescopic edge protection post 1 and preventing the movable element 10 from being removed by the retainment portion 17 hitting the shoulder 19 at an end position. Thus, the distance of movement of the movable element 10 from the locking position to the non-locking position is restricted by the retainment portion 17 and the shoulder 19, which thereby prevent the movable element 10 from completely leaving the space between the fixed element 9 and the inner tube 5. However, it should be noted that when the inner tube 5 has been removed from the outer tube 2 it is possible to remove/demount and mount the movable element 10.

In embodiments of the telescopic edge protection post 1 there is a gap G, see FIG. 4, between the inner tube 5 and the outer tube 2 making the extension and retraction of the telescopic edge protection post 1 easy. Additionally, the gap G is wide enough to allow minor damages of the walls of the tubes 2, 5, such as indentations of the outer tube walls, without causing obstruction of the movement of the outer and inner tubes 2, 5 in relation to each other. At its lower end 6 the inner tube 5 is provided with guide protrusions 20 arranged at the corners thereof and protruding from the outer surface of the inner tube 5 into the gap G. The guide protrusions 20 makes the telescopic edge protection post 1 feel more stable and rigid to a user since they limit lateral movement of the inner tube 5 relative to the outer tube 2. Thereby, the gap G can be larger than a minimum play necessary to allow an easy telescoping of the telescopic edge protection post 1.

In embodiments of the telescopic edge protection post 1 it comprises an alternative locking mechanism 55. The locking mechanism 55 is arranged at the top end of the outer tube 2, and comprises a fixed element 56, shown with broken lines in FIG. 11, and a movable element comprising a roller 57 having first portions 58 arranged to engage with the first two adjacent sides 41, 42 of the inner tube 5, and second portions, constituting opposite shaft ends, 59 of the roller 57 extending into grooves 60 of the fixed element 56. The diameter of the first portions 58 is larger than the diameter of the second portions 59. The grooves 60 extend obliquely relative to the longitudinal axis of the telescopic edge protection tube 1. The roller is movable along the grooves 60, and consequently the roller 57 is movable between the locking position and the non-locking position.

Figure 12:
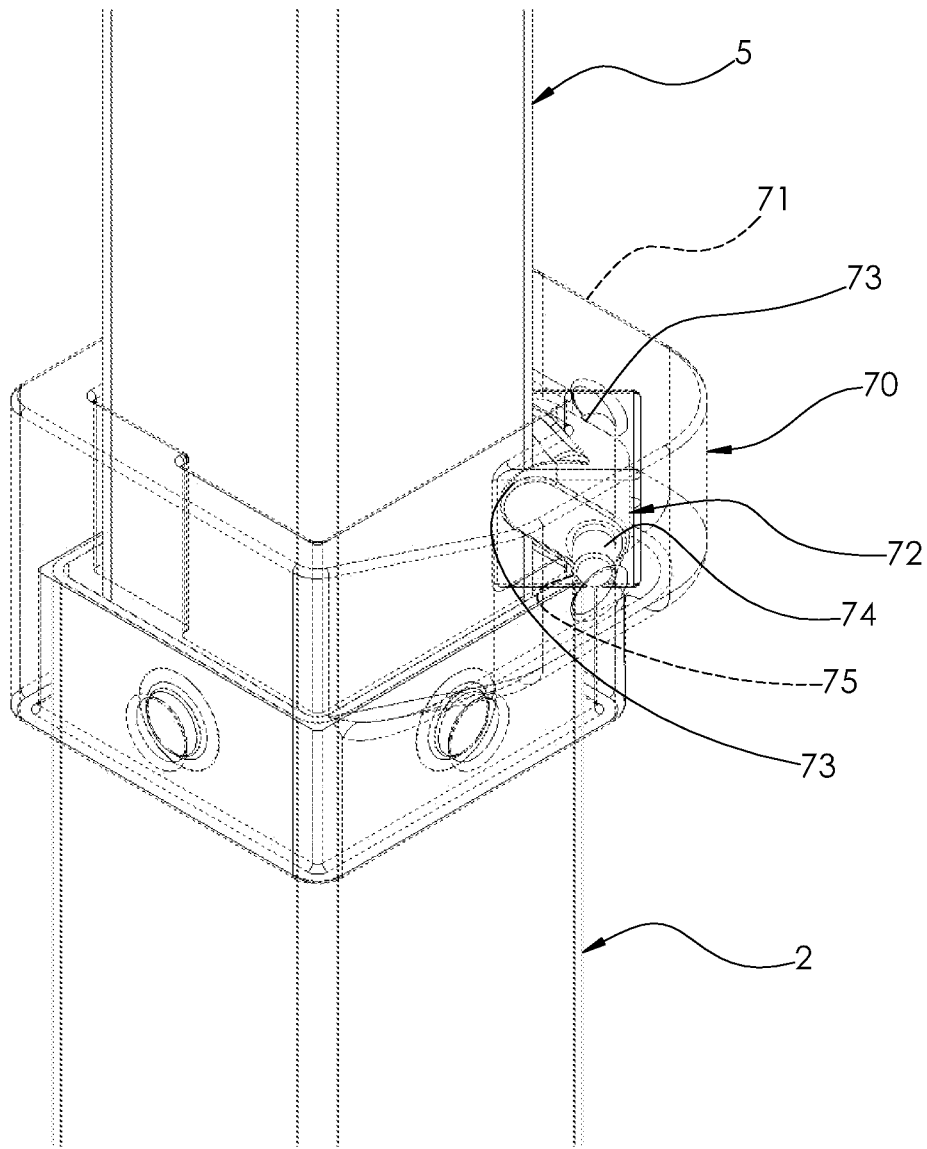

In embodiments of the telescopic edge protection post 1 it comprises another alternative locking mechanism 70, shown in FIG. 12. The locking mechanism 70 is arranged at the top end of the outer tube 2, and comprises a fixed element 71, shown with broken lines in FIG. 11, and a movable element comprising an eccentrically rotatable member 72 having engagement protrusions 73 arranged to engage with the first two adjacent sides 41, 42 of the inner tube 5 at front portions of the engagement protrusions 73, and opposite shaft ends, 74 extending from rear portions of the engagement protrusions 73 into seats 75 of the fixed element 71. For instance, there is a V-shaped groove between the engagement protrusions 73, which groove receives the corner and the first two adjacent sides of the inner tube 5 in the locking position. The shaft ends 74 are rotatable in the seats 75. Thereby, the eccentrically rotatable member 72 is pivotable like a door about the shaft ends 74 between the locking and non-locking positions.

Figure 6:
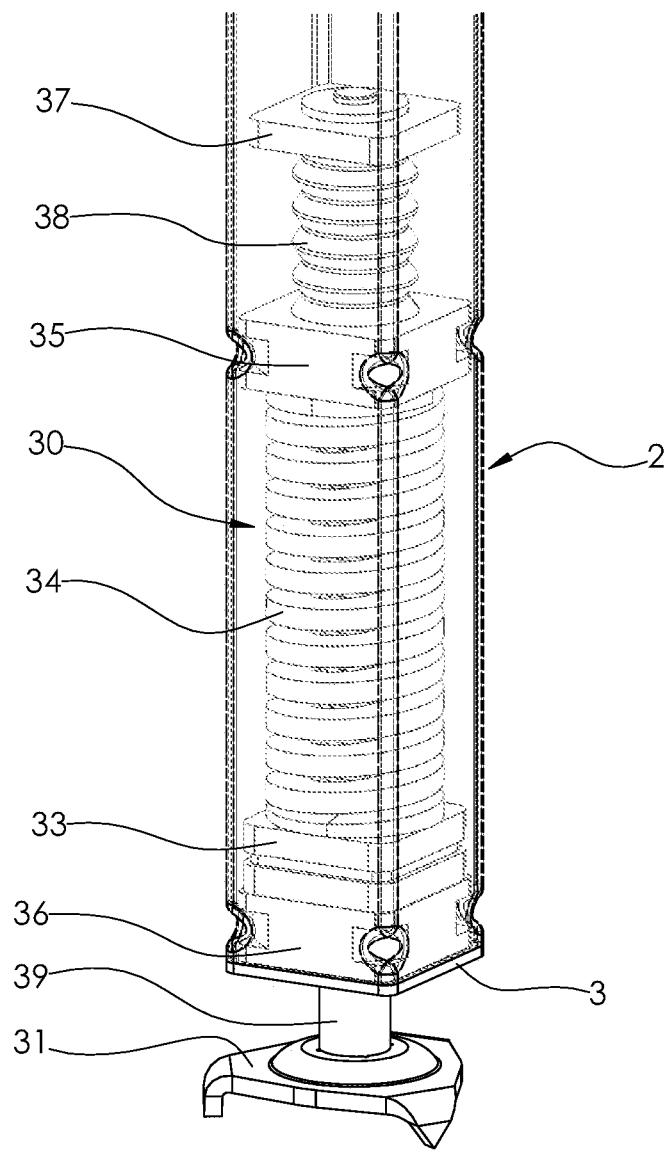
FIGS. 6 and 7 are perspective views showing a tensioning device comprised in embodiments of the telescopic edge protection post.
Figure 7:
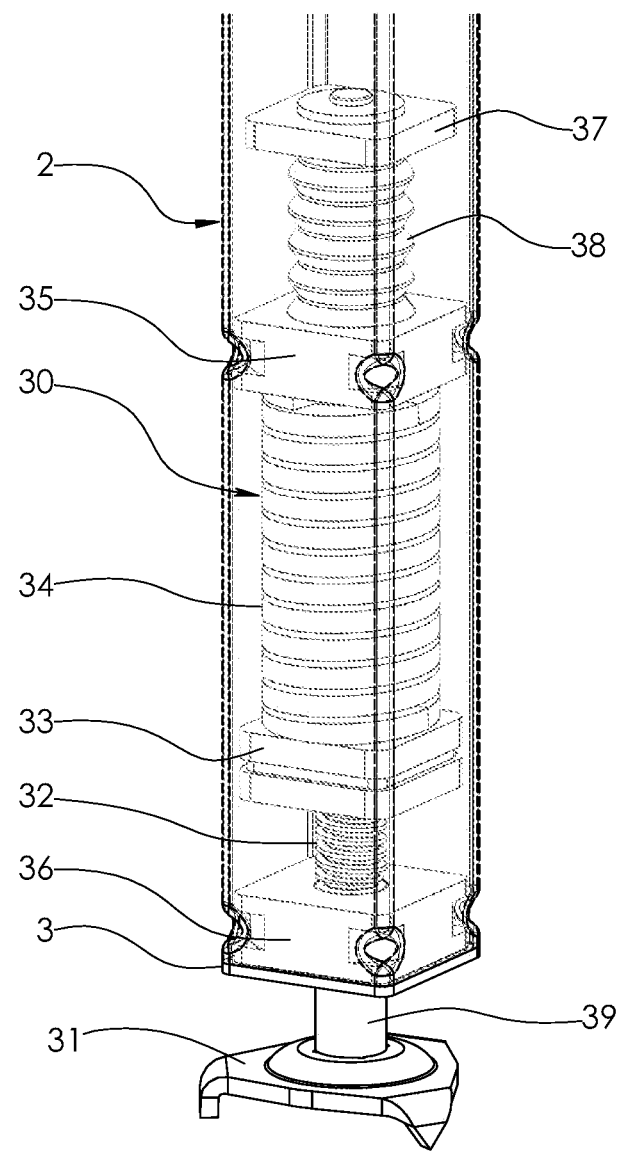

Referring to FIGS. 6 and 7, in embodiments of the telescopic edge protection post 1 comprises a tensioning device, which in turn comprises a lower tensioning device 30 arranged at the floor end 3 of the outer tube 2. The lower tensioning device 30 is attached to the floor gripper 31 More particularly, the lower tensioning device 30 comprises a threaded rod 32 having a first end attached to the floor gripper 31 and extending into the outer tube 2, the threaded rod 32 being rotatably and longitudinally movably mounted at the outer tube 2, a nut 33 threadedly engaged with the threaded rod 32 and slidingly arranged with respect to the outer tube 2 inside thereof, and a spring 34 extending within the outer tube 2 between the nut 33 and a spring seat 35, which is fixed, at least in a spring expansion direction, relative to the outer tube 2. The threaded rod 33 extends with a clearance through the spring 34 and the spring seat 35. By rotating the outer tube 2, and thus the whole telescopic edge protection post 1, in a tensioning direction, the nut 33 rotates on the thread and is thereby moved upwards, i.e. away from the floor end 3. The movement of the nut causes the spring 34 to be compacted, and consequently tensioned, as shown in FIG. 7. The nut 33 has a peripheral shape that causes portions of its peripheral surface to engage with the inner surface of the outer tube 2 when it is rotated, in order to cause the nut 33 to rotate along with the outer tube 2. For instance, the peripheral shape is made to resemble the cross-sectional shape of the outer tube 2, i.e. the peripheral shape is generally rectangular when the outer tube 2 has a rectangular cross-section, etc. However, basically it is enough that the nut 33 has a maximum lateral extension, measured from its center, that in some direction exceeds a minimum lateral distance measured from the longitudinal axis of the outer tube 2 to its inner surface.

A rod guide 36 is arranged between the foot 31 and the nut 33, preferably at the mouth of the outer tube 2, and preferably inside the outer tube 2. The threaded rod 32 extends through a center hole of the rod guide 36 and is provided with a stop portion 39 that is engageable with the rod guide 36 to prevent the threaded rod from moving further into the outer tube 2 when the stop portion 39 has engaged with the rod guide 36, but allows the threaded rod 32 to move in the opposite direction, i.e. out of the outer tube 2. Additionally, the threaded rod 32 is kept from falling out or being pulled out of the outer tube 2, for instance by the nut 33 being unable to pass the rod guide 36.

The threaded rod 32 extends beyond the spring seat 35 towards the top end of the outer tube 2. A stop element 37, such as a washer, is provided at a second end of the threaded rod 32. The stop element 37 extends laterally beyond the thread of the threaded rod 32 and prevents the threaded rod 32 from moving down past the spring seat 35. There is a distance between the spring seat 35 and the stop element 37, where a bumper 38 is arranged. If the locking mechanism 8 is accidentally unlocked, and the telescopic edge protection post 1 is thereby retracted, without first releasing the tension, the bumper 38 will prevent possible damage to the lower tensioning device 30. For instance, the bumper 38 is generally cylindrical and is arranged concentrically of the threaded rod 32.

The lower tensioning device provides advantages when applied in combination with the locking mechanism, such as reducing the weight of the inner tube making it easier to handle by hand when operating the locking mechanism. Additionally, the lower tensioning device is novel as such and could be used with other kinds of locking mechanisms as well.

The telescopic edge protection post 1 is operated as follows. From a collapsed state the telescopic edge protection post 1 is extended by lifting the inner post 5 by hand to an extended position where the ceiling gripper 21 reaches the ceiling. This may require several lifts. Each time the user lets go of the inner tube 5 the locking mechanism 8 locks the inner tube 5 and keeps the telescopic edge protection post 1 in the extended position. Each time the user start lifting the inner tube 5 further up the locking mechanism is released The locking mechanism 8 is self-locking by the movable element 10 being pulled downwards by gravity forces while sliding on the slide surface 11 of the fixed element 9 into a firm engagement with the outer surface of the inner tube 5. The locking mechanism is self-releasing too since the movable element 10 is pulled out of the locking position by the inner tube 5 due to the engagement with the outer surface of the inner tube 5, and then the movable element 10 is disengaged from the inner tube 5 allowing it to be further lifted to extend the post 1. Consequently, the locking mechanism 8 is springless. Having reached the ceiling, the telescopic edge protection post 1 is rotated in a tensioning direction such that the nut 33 moves away from the floor end 3 towards the top end 4 of the outer tube 2, while the floor gripper 31 is fixed relative to the floor. Thereby, the spring 34 is compressed and exerts an upwardly directed force on the spring seat 35, which in turn exerts an upwardly directed force on the outer tube 2 being movable relative to the foot 31. Via the locking mechanism 8 and the inner tube 5 this force is exerted on the ceiling by the ceiling gripper 21. An advantage of the telescopic edge protection post 1 is that when rotating it in the tensioning direction, the floor end 3 of the outer tube 2 remains at the same height or at least substantially the same height.

When the telescopic edge protection post 1 is to be removed the tension is released by first rotating the post 1 in an opposite direction to the tensioning direction, and then releasing the locking mechanism by moving the movable element from the locking position to the non-locking position. This can be done by pulling the movable element 10 upwards by hand or by using a tool to move it upwards.

Figure 13:
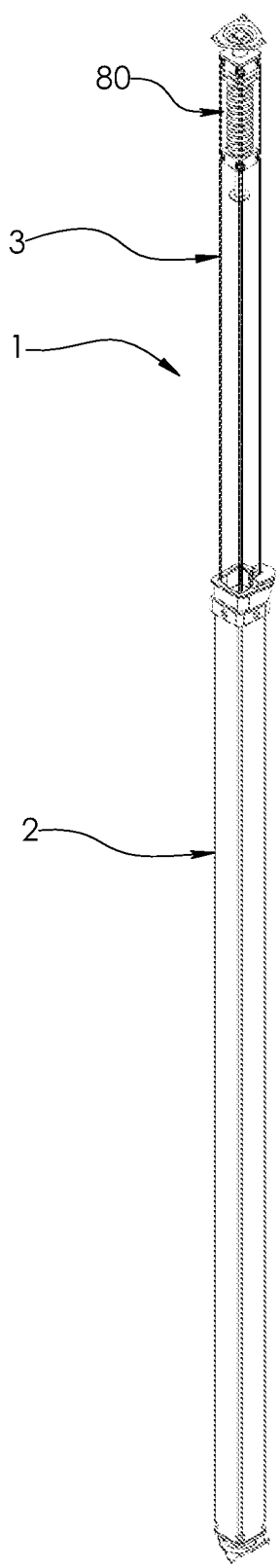
FIG. 13 is a perspective view showing a tensioning device comprised in embodiments of the telescopic edge protection post.

In embodiments of the telescopic edge protection post 1 the tensioning device comprises an upper tensioning device arranged at the ceiling end 7 of the inner tube 5. The upper tensioning device can be provided as an alternative to the lower tensioning device 30. In that case the above-described lower tensioning device can be arranged at the ceiling end of the inner tube instead, as shown in FIG. 13 where reference numeral 80 denotes the tensioning device, thus constituting an upper tensioning device. However, there is an advantage of arranging it at the floor end of the outer tube, as explained above. Another example of an upper tensioning device is the upper tensioning device shown in above-mentioned U.S. Pat. No. 8,152,118.

In other embodiments the upper tensioning device is provided in combination with the lower tensioning device 30. For instance, the upper tensioning device may comprise a spring that has a substantially lower spring constant than the spring of the lower tensioning device, making it possible to tension the upper tensioning device by hand. Thereby, when extending the telescopic edge protection post and the inner tube reaches the ceiling, the upper tensioning device is tensioned, rendering the post to easier stand by itself, followed by rotating the post to tension the lower tensioning device.

While the concepts have been illustrated and described in detail in the drawings and foregoing description, such illustration and description are to be considered illustrative or exemplary and not restrictive. The concepts are not limited to the disclosed embodiments.

Other variations to the disclosed embodiments can be understood and effected by those skilled in the art in practicing the claims, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A telescopic edge protection post arrangeable between a floor and a ceiling, the telescopic edge protection post comprising an outer tube having a floor end and a top end, and having a polygonal cross-section, an inner tube having a bottom end and a ceiling end, and having a polygonal cross-section, wherein the inner tube extends into the outer tube and is movable with respect thereto between an extended position and a collapsed position, a locking mechanism arranged to lock the inner tube with respect to the outer tube, and a tensioning device, wherein the locking mechanism comprises a fixed element, which is attached to the outer tube at its top end, and a movable element, which is movable with respect to the fixed element between a locking position in which the movable element engages with the inner tube and the fixed element to prevent the inner tube from being retracted into the outer tube, and a non-locking position in which the inner tube is retractable into the outer tube, wherein the movable element is arranged at a corner of the inner tube and is engaged with, at least in the locking position, first two adjacent sides of the inner tube at said corner, thereby fixing, in the locking position, the inner tube relative to the outer tube in all transverse directions of the telescopic edge protection post.

2. The telescopic edge protection post according to claim 1, wherein the engagement between the movable element and the inner tube, in the locking position, is frictional.

3. The telescopic edge protection post according to claim 1, wherein the fixed element comprises an inner surface surrounding the inner tube and being provided with protruding surface portions at a corner of the inner tube opposite of the corner where the movable element is arranged, wherein the protruding surface portions extend at an angle to each other and parallel with second two adjacent sides of the inner tube, and wherein the protruding surface portions are engaged with the inner tube in the locking position.

4. The telescopic edge protection post according to claim 1, wherein the movable element is arranged to move upwards and outwards from the locking position to the non-locking position.

5. The telescopic edge protection post according to claim 1, wherein the movable element has an inner engagement surface facing an outer surface of the inner tube, wherein the inner engagement surface is arranged to engage with the outer surface of the inner tube.

6. The telescopic edge protection post according to claim 5, wherein the inner engagement surface is provided with grip protrusions, which provide the engagement with the outer surface of the inner tube.

7. The telescopic edge protection post according to claim 1, wherein the movable element is wedge-shaped.

8. The telescopic edge protection post according to claim 1, wherein the movable element comprises one of a rotatable roller and an eccentrically rotatable member.

9. The telescopic edge protection post according to claim 1, wherein there is a gap between the inner tube and the outer tube, and wherein the inner tube is provided with guide protrusions protruding outwardly from an outer surface of the inner tube at the bottom end thereof.

10. The telescopic edge protection post according to claim 1, wherein the tensioning device comprises a lower tensioning device arranged at the floor end of the outer tube.

11. The telescopic edge protection post according to claim 10, comprising a floor gripper at the floor end of the outer tube and constituting a foot of the telescopic edge protection post, wherein the lower tensioning device comprises a threaded rod having a lower end attached to the floor gripper and extending into the outer tube, the threaded rod being rotatably and longitudinally movably mounted at the outer tube, a nut threadedly engaged with the threaded rod and slidingly arranged within the outer tube, and a spring extending within the outer tube between the nut and a spring seat, which is fixed, at least in a spring extension direction, relative to the outer tube, wherein the threaded rod extends through the spring and the spring seat, the spring thereby being tensioned by rotating the outer tube.

12. The telescopic edge protection post according to claim 1, wherein the tensioning device comprises an upper tensioning device arranged at the ceiling end of the inner tube.

13. A telescopic edge protection post arrangeable between a floor and a ceiling, the telescopic edge protection post comprising an outer tube having a floor end and a top end, and having a polygonal cross-section, an inner tube having a bottom end and a ceiling end, and having a polygonal cross-section, wherein the inner tube extends into the outer tube and is movable with respect thereto between an extended position and a collapsed position, a locking mechanism arranged to lock the inner tube with respect to the outer tube, and a tensioning device arranged at an end of the telescopic edge protection post constituting one of the floor end of the outer tube and the ceiling end of the inner tube, and a gripper at each end of the telescopic edge protection post, wherein the tensioning device comprises a threaded rod having a first end attached to the gripper and extending into the telescopic edge protection post, the threaded rod being rotatably and longitudinally movably mounted at the tube at which it is arranged, a nut threadedly engaged with the threaded rod and slidingly arranged within said tube, and a spring extending within said tube between the nut and a spring seat, which is fixed, at least in a spring extension direction, relative to said tube, wherein the threaded rod extends through the spring and the spring seat, the spring thereby being tensioned by rotating the telescopic edge protection post.

14. A telescopic edge protection post according to claim 13, wherein the tensioning device is arranged at the floor end, and wherein the gripper is a floor gripper.

15. A telescopic edge protection post according to claim 13, wherein there is a distance between the spring seat and a second end of the threaded rod opposite of the first end, wherein the tensioning device comprises a bumper arranged between the second end and the spring seat.

* * * * *